(12) United States Patent
Verner et al.

(10) Patent No.: US 8,440,007 B2
(45) Date of Patent: May 14, 2013

(54) AIR FILTRATION SYSTEMS

(75) Inventors: Neil Antony Verner, Wakefield (GB);
Philip John Prosser, Beaconsfield (GB)

(73) Assignee: Sideland Engineering Limited, London (GB)

( * ) Notice: Subject to any disclaimer, the term of this patent is extended or adjusted under 35 U.S.C. 154(b) by 610 days.

(21) Appl. No.: 12/409,233

(22) Filed: Mar. 23, 2009

(65) Prior Publication Data

US 2010/0132550 A1 Jun. 3, 2010

(30) Foreign Application Priority Data

Sep. 21, 2006 (GB) .................................. 0618633.2
Nov. 6, 2006 (GB) .................................. 0622069.3

(51) Int. Cl.
*B01D 47/06* (2006.01)

(52) U.S. Cl.
USPC .................. 96/270; 96/271; 96/322; 96/361; 96/366; 96/371

(58) Field of Classification Search .................... 95/151, 95/187, 214–217, 221–224; 96/270–273, 96/280, 322, 296–300, 355–358, 361–366, 96/369, 371
See application file for complete search history.

(56) References Cited

U.S. PATENT DOCUMENTS

| | | | | |
|---|---|---|---|---|
| 2,068,094 A | * | 1/1937 | Webre | 239/500 |
| 2,259,626 A | * | 10/1941 | Erikson | 454/55 |
| 2,380,826 A | * | 7/1945 | Dorfan | 261/112.1 |
| 3,109,593 A | * | 11/1963 | Newland, Sr. | 239/275 |
| 3,324,629 A | * | 6/1967 | Edward Graswich et al. | 95/150 |
| 3,563,005 A | * | 2/1971 | Jones | 96/239 |
| 3,653,179 A | * | 4/1972 | Doane | 95/267 |
| 3,802,158 A | | 4/1974 | Ohle | |
| 3,802,329 A | * | 4/1974 | Wright | 126/299 R |
| 3,837,269 A | * | 9/1974 | Sweet et al. | 126/299 E |
| 5,308,385 A | * | 5/1994 | Winn | 95/195 |
| 6,059,865 A | | 5/2000 | Poteat | |
| 6,059,866 A | * | 5/2000 | Yamagata et al. | 96/251 |

(Continued)

FOREIGN PATENT DOCUMENTS

| | | |
|---|---|---|
| DE | 19949599 A1 | 4/2001 |
| DE | 10127678 A1 | 1/2003 |

(Continued)

*Primary Examiner* — Duane Smith
*Assistant Examiner* — Ives Wu
(74) *Attorney, Agent, or Firm* — Hultquist, PLLC; David Bradin

(57) ABSTRACT

An air filtration system is described for removing oil and grease entrained in air extracted from the region above a cooker. The system comprises a first mesh screen filter leading to a first chamber, in which two nozzles 10 create two separate continuous water curtains 15a, 15b which overlap when viewed in the direction of the air flow to form a combined curtain extending across the region through which the air passes. The extracted air then passes via a second mesh screen filter 11 into a second chamber 12, identical to the first chamber 9, in which two further nozzles 13 are provided which create two further water curtains 15c, 15d. The water curtains 15a, 15b, 15c, 15d cool and condense vaporized oil and grease within the air, which condensed oil and grease droplets fall with the water into a container. The main bore of each nozzle is of circular cross-section, but a profiled plate causes the resulting water curtain to have a width which is narrow relative to the diameter of the nozzle bore. The water contains dissolved ozone and can also be "grey water".

15 Claims, 8 Drawing Sheets

U.S. PATENT DOCUMENTS

| | | | |
|---|---|---|---|
| 6,079,407 A * | 6/2000 | Lai | 126/299 E |
| 6,817,356 B2 | 11/2004 | Gallagher | |
| 6,946,021 B2 | 9/2005 | Aoyagi | |
| 7,875,108 B2 * | 1/2011 | Takahashi et al. | 96/227 |
| 2002/0157661 A1 | 10/2002 | Kornberger | |
| 2004/0206347 A1 * | 10/2004 | Gallagher | 126/299 E |
| 2007/0056446 A1 * | 3/2007 | So | 96/233 |
| 2007/0193574 A1 * | 8/2007 | Kessler et al. | 126/299 D |

FOREIGN PATENT DOCUMENTS

| | | | |
|---|---|---|---|
| DE | 10127678 B4 | | 2/2004 |
| GB | 2138127 A | * | 10/1984 |
| GB | 2302004 A | | 12/1996 |
| IT | EP 570656 A1 | * | 11/1993 |

\* cited by examiner

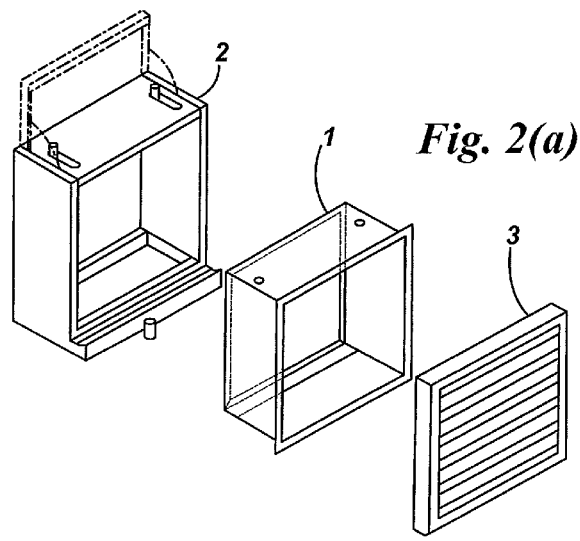
*Fig. 2(a)*
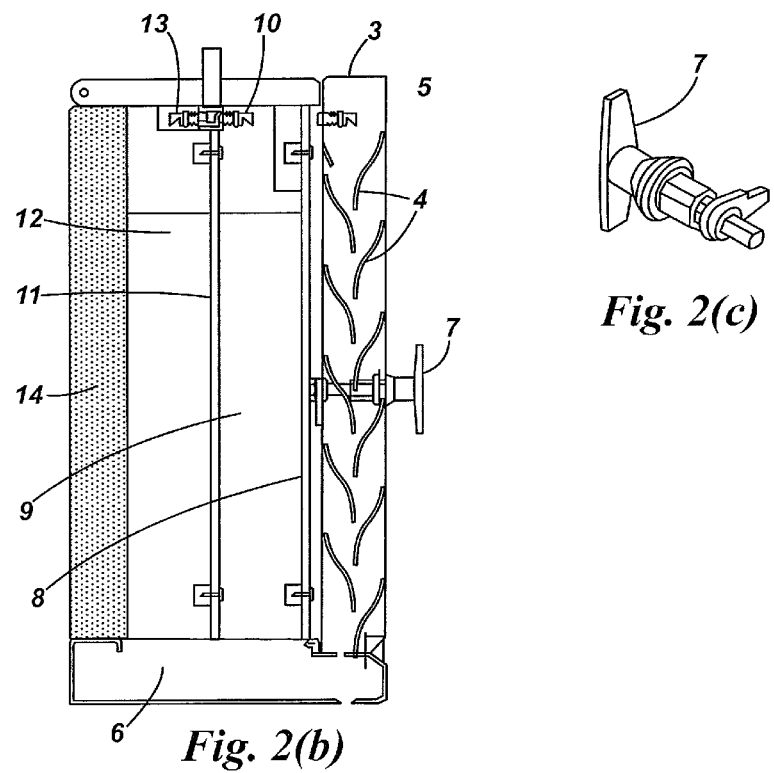
*Fig. 2(b)*
*Fig. 2(c)*

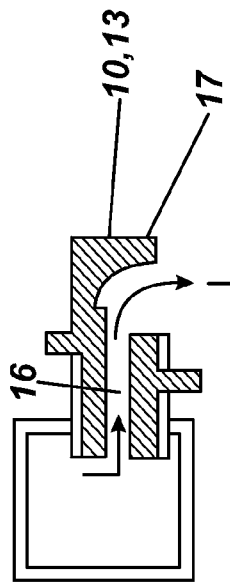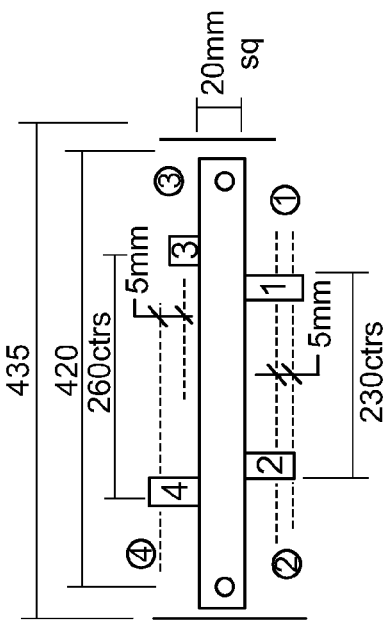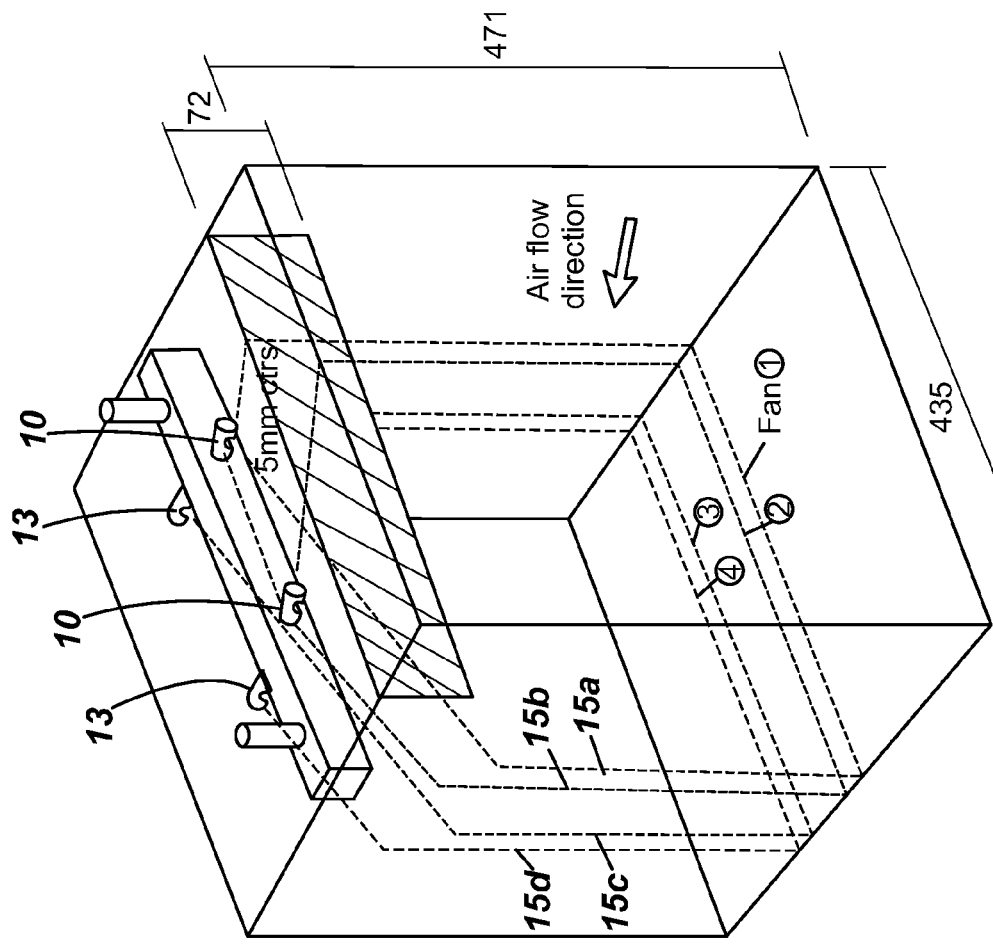

AIR FILTRATION SYSTEMS

CROSS-REFERENCE TO RELATED APPLICATIONS

This application is a U.S. national phase under the provisions of 35 USC §371 of International Application No. PCT/GB07/03547 filed Sep. 19, 2007, which in turn claims priority of Great Britain Patent Application No. 0618633.2 filed Sep. 21, 2006, and Great Britain Patent Application No. 0622069.3 filed Nov. 6, 2006. The disclosures of such international application and Great Britain priority applications are hereby incorporated herein by reference in their respective entireties, for all purposes.

The present invention relates to air filtration systems and, in particular, to such systems arranged for removing contaminants from an air stream, such as arise in air extractors positioned above commercial cooking apparatus, where organic lipid contaminants such as fats, oil and grease (known collectively as "FOGS") often entrained within the air stream. The invention can also be applied to extraction ducts within a plant room.

Such contaminants, apart from presenting environmental pollution and a health and safety risk, also constitute a fire hazard. As is well known in the field of fire prevention, the "triangle of fire" consists of the three necessary factors for a fire to start, which are heat, fuel and oxygen. In the case of fires arising in the type of commercial cooking apparatus which is provided with a duct for the extraction of air, not only can the fire extend into the duct, but residual FOGS deposited in the duct constitute a "fuel load" which can maintain such a fire. As will be appreciated, fires occurring within ducts are notoriously difficult to extinguish, because of the restricted access to such regions. Indeed, fires occurring within air extractor ducts are believed to give rise to the greatest consequential financial losses in fires in commercial cooking environments.

Clearly, it would be desirable to provide arrangements which seek not only to prevent fires from entering ducts in the first place, but also to prevent the maintenance of a fire which happens to spread within the duct. In one aspect, the present invention seeks to provide a system in which both heat and fuel are removed from the duct, thereby eliminating two of the three factors of the triangle of fire.

Conventional air filtration systems comprise sheets of filter material which require frequent cleaning or replacement. Improved systems have been developed in which the surface of the filter material is irrigated by one or more sprays of water which serve to remove the contaminants.

It would be desirable to provide an air filtration system which overcomes, or at least mitigates, this and other disadvantages of such known systems and which provides a method of filtration which is more effective at removing certain contaminants from an air stream.

Thus, in accordance with a first aspect of the present invention there is provided an air filtration system comprising means defining an air flow path and means for generating a substantially continuous curtain of water which, when viewed along the air flow direction, extends substantially completely across the air flow path, the arrangement being such that, on traversing the water curtain, the air is cooled, thereby causing vaporised impurities entrained therein to condense and to fall under gravity and/or water pressure out of the air flow path.

By providing such a curtain of water, substantially all of the air is caused to pass through the curtain, thereby cooling substantially all of the air and thereby optimising the condensation of the contaminants. Such effective cooling of the air stream also reduces the fire hazards associated with air filtration systems. In addition, since water is an effective thermal conductor, heat will be caused to dissipate in the event of a fire, which will prolong the outbreak of the fire through the extractor hood.

Such a system finds particular application in air extractors within commercial catering environments, in which cooking apparatus presents a substantial risk of fire as a result of the combination of heat and highly inflammable vapours and grease entrained in the extracted air. By placing the filtration system in the kitchen which contains the cooking apparatus, any fire within the kitchen is prevented from spreading into other areas through the air extraction system. In this case, the water supply for the filtration system is preferably also located in the kitchen. This eliminates the need for a separate water supply to be fitted, and thereby also eliminates the risk of fire spreading through apertures in the kitchen wall through which pipes connecting the water supply to the filtration system would otherwise be required.

The water curtain is preferably formed from at least two smaller curtains of water, each of which extends only partway across the air flow path but which overlap when viewed along the air flow direction to form the composite curtain which extends fully across the air flow path.

By having a number of smaller curtains of water, each curtain can be generated by a nozzle having an angular range of spray which is smaller than would be required with a single curtain.

The at least two curtains of water may be located at different positions along the air flow path, so that interaction between the curtains is avoided, or at least reduced, so as to inhibit turbulent flow of water within the curtain.

The curtain generating means preferably comprises at least one nozzle of substantially circular cross-section and a respective at least one plate, disposed in relation to its associated nozzle such that water emerging from the or each nozzle is deflected by its associated plate to create a continuous substantially flat curtain of water. This arrangement is advantageous, since any impurities in the water are less likely to cause a blockage in the nozzle that would be the case if the curtain were generated using simply a narrow nozzle. The water is preferably pressurised to between 3 and 4 bar gauge, i.e. between 3 and 4 bar above atmospheric pressure. This contrasts with mains water, which is typically supplied at a pressure of between 0.5 bar and 3 bar gauge.

In accordance with a second aspect of the present invention there is provided an air filtration system comprising means defining an air flow path and means for generating a substantially continuous curtain of water through which the air is caused to pass in use, the curtain generating means comprising a nozzle of substantially circular cross-section and a plate, disposed in relation to the nozzle such that water emerging from the nozzle is deflected by the plate to create the continuous curtain of water.

First and second filter screens are preferably located within the air flow path respectively upstream and downstream of the position of the water curtain.

A baffle arrangement is preferably located upstream of the first filter screen for removing relatively heavy particulates from the air. Such an arrangement effectively constitutes a momentum separator by which relatively heavy particulates are diverted away from the air stream and fall under gravity. The design of the baffles is such as to prevent any water vapour or water droplets from being emitted from the upstream end of the filtration system.

A mesh filter is preferably located downstream of the second filter screen for removing residual particulates from the air.

The present invention extends to an air filtration system, suitable for use in a plant room and comprising an array of air filtration systems of the above type.

The present invention further extends to an air filtration system, suitable for use in a plant room and comprising an upstream and a downstream array of filters, each filter within the arrays being of the above type. In this case, each of the upstream array of filters preferably comprises a baffle arrangement located upstream of the filter for removing relatively heavy particulates from the air, in which case there is no need for a corresponding baffle arrangement to be provided on the downstream filters.

The water may comprise dissolved ozone at a concentration of at least 1 ppm by mass.

The air filtration system advantageously further comprises means for re-circulating the water after use. In applications where FOGS are entrained in the water, a filter is provided for trapping the FOGS prior to re-circulation. Such an arrangement is not only environmentally friendly, but cost-effective when the filtration system is arranged in regions of the world in which water is scarce.

In accordance with a third aspect of the present invention there is provided an air filtration system comprising means defining an air flow path and means for generating a stream of water through which the air is caused to pass, wherein the water comprises dissolved ozone at a concentration of at least 1 ppm by mass.

The air filtration system preferably further comprises means for ionising the water. Ionised water provides a number of benefits, such as enhanced cleaning power, increased sterility and an enhanced attraction of pollutants.

In preferred embodiments of the above systems, although ozone may be dissolved in the water, no detergents of any kind are employed. Not only does this assist in the re-cycling of the water, but the resulting system is not only cheaper, but more environmentally friendly.

An electrostatic precipitator may be provided in any of the above systems for removing smoke prior to atmospheric discharge.

The system preferably further comprises a telemetry system for enabling remote diagnostics and maintenance of the system.

The above air filtration systems are preferably provided with an electronic system for monitoring and controlling their operation. The monitor and control system preferably uses digital technology and is advantageously provided with memory units such as EPROMs, which retain status information in the event of a power failure. Furthermore, the monitor and control system may include internal batteries which provide a back-up in the event of a mains power failure.

The monitor and control system is preferably arranged to be upgraded by uploading suitable software, since this eliminates the need for changes to the hard-wiring. In a particularly preferred arrangement, the monitor and control system is connected to an ISDN telephone line, such that the control software can be uploaded from a remote location.

The systems of the present invention are preferably arranged within a cartridge which can readily be installed within a housing in the form of a canopy located above a commercial cooking apparatus. The size and shape of the canopy is adjusted so as to fit the particular configuration of the cooking apparatus, but the canopy is provided with a standard-sized aperture into which the cartridge is fitted. This arrangement enables cartridges to be manufactured in a single size, which facilitates the replacement of faulty cartridges or cartridges which have been removed for repair or reconditioning.

The present invention extends to a method of filtering air extracted into a flow path from a commercial cooking apparatus, the method comprising: generating a substantially continuous curtain of water which, when viewed along the flow path, extends substantially completely across the air flow path, the arrangement being such that, on traversing the water curtain, the air is cooled, thereby causing vaporised impurities entrained therein to condense and to fall under gravity out of the air flow path.

The substantially continuous curtain of water is preferably pressurised. Advantageously, the pressure is between 3 and 4 bar gauge pressure.

The present invention further extends to a method of filtering air flowing along a path, the method comprising: generating a stream of water through which the air is caused to pass, wherein the water comprises dissolved ozone at a concentration of at least 1 ppm by mass.

Preferred embodiments of the invention will now be described with reference to the accompanying drawings, in which:

FIG. 2(a) is an exploded view of the main components of an air filtration system in accordance with a preferred embodiment of the present invention;

FIG. 2(b) is a cross-sectional view of the system of FIG. 2(a);

FIG. 2(c) is an isometric view of a locking handle for retaining the baffle in position;

FIG. 3(a) is an isometric view of the cartridge used in the system of FIG. 2(a);

FIG. 3(b) is a vertical cross-sectional view of a nozzle used in the system of FIG. 2(a);

FIG. 3(c) illustrates the arrangement of nozzles in the system of FIG. 2(a);

Figure 1:
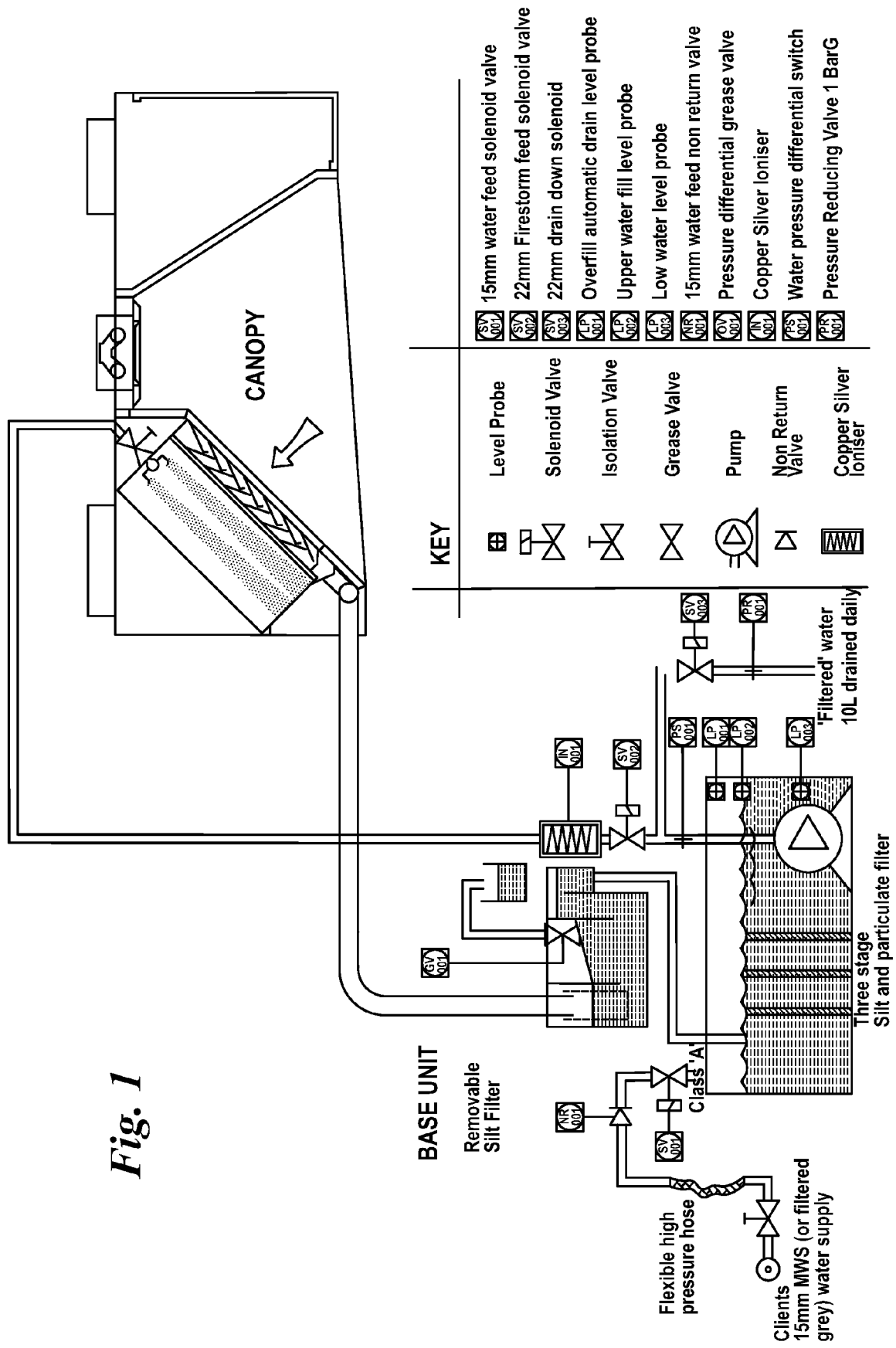
FIG. 1 is a schematic view of the complete system of a preferred embodiment of the present invention.

FIG. 1 illustrates the complete system of a preferred embodiment of the present invention. The components of the system collectively labelled "CANOPY" comprise a unit of an air filtration system which is mounted in use above a commercial cooking installation and oriented such that exhaust air is caused to pass into the unit and also such that the FOGS entrained in the exhaust air stream are condensed by a water curtain within the unit and caused to fall under gravity into a conduit mounted at the bottom of the unit. The components of the CANOPY are described in greater detail below.

The water, together with the condensed FOGS are then caused to flow to a further unit of the system labelled as the "BASE UNIT", to be described in greater detail below. The functions of the BASE UNIT are to filter and collect the FOGS from the water for re-use as fuel, and to re-circulate the water back up to the CANOPY for re-use.

Referring to FIG. 2(a), the air filtration system of the preferred embodiment of the present invention comprises a cartridge 1 located within a housing 2 and a baffle 3 through which air from an extractor above a cooker is supplied.

Referring to FIG. 2(b), the baffle 3 is in the form of a number of angled vanes 4 which act as a momentum brake for heavy particulates entrained in the extracted air, thereby causing impurities, such as oil and grease, entrained in the air to fall under gravity into a base unit 6 in the form of a collection container located below the baffle 3.

The baffle 3 is provided with a handle 7 (shown in more detail in FIG. 2(c)) for ease of attachment and removal of the baffle 3.

The cartridge 1 further comprises, downstream of the baffle 3, a first mesh screen filter 8, which serves to even out air flow before entering a first chamber 9, in which two further nozzles 10 create two respective longitudinally separated continuous curtains of water but which overlap when viewed in the direction of air flow within the chamber to form a combined curtain which extends fully across the region where the extracted air passes through the chamber 9. By separating the two curtains longitudinally, this helps to reduce water turbulence within the chamber 9. Thus, all of the extracted air passing into the first chamber 9 passes through this combined water curtain.

The extracted air then passes via a second mesh screen filter 11 into a second chamber 12, which is identical to the first chamber 9. The second mesh screen filter 11 may advantageously be provided with a smaller pitch than that of the first mesh screen filter 8 to allow it to capture any larger particulates which may have penetrated the first mesh screen 8.

As in the first chamber 9, there are provided two water nozzles 13 are provided in the second chamber 12 which create two further curtains of water which are essentially identical to those in the first chamber 9.

The water curtains function to cool, and thereby condense, the remaining vaporised oil and grease within the extracted air. The condensed droplets of oil and grease then fall under gravity, along with the water, into the base unit 6.

The air is finally extracted from the system via a stainless steel mesh filter 14, which ensures that any remaining particulates emerging through the second chamber 12 are removed by momentum brake generated by the large number of sharp changes of direction of the air flow paths within the mesh filter 14. It also ensures that the amount of water entrained in the air extracted from the filter system is minimal.

FIG. 3(a) illustrates the nozzle arrangement in more detail, and the water curtains 15a, 15b, 15c and 15d are indicated by dashed lines. As can be seen in the drawing, the four water curtains 15a, 15b, 15c, 15d are spaced longitudinally, i.e. in the direction of the air flow through the filter, from each other by 5 mm, and the uppermost part of curtains 15a and 15c extend over a region which is displaced to the right (as viewed in the drawing) relative to the uppermost part of the curtains 15b and 15d. However, as viewed in the direction of the air flow, the uppermost parts of curtains 15a and 15c overlap the uppermost parts of curtains 15b and 15d.

The structure of each of the nozzles, 10, 13 is shown in greater detail in FIG. 3(b). The main bore 16 of the nozzle is made of stainless steel tube of 20 mm² area circular cross-section, but the provision of a profiled plate 17 gives rise to the formation of a curtain of water of narrow width relative to the diameter of the circular bore of the nozzle. The angular range of the spray from each nozzle is 130°.

The dimensions of the preferred embodiment are shown in FIG. 3(c).

In operation of the system, the water and grease are directed to the base unit 6 and then via a weir to a fat removal unit, which is in the form of a single- or dual-stage multi-section grease trap. The grease trap, together with a particulate filter are installed within the base unit, and the capacity of the grease trap allows for settlement and separation of grease from the water and filtration of the particulate, thereby reducing the likelihood of the nozzles becoming blocked. Clean water is returned to a recirculation tank and then pumped back to the nozzles.

The grease separation tank is removed periodically and the contents re-cycled in an environmentally friendly manner, such as, for example, to generate methane gas for power generation.

The water pressure is maintained between 3 and 4 bar gauge. A pressure sensor may be installed to detect a drop in pressure, which would indicate the failure of a feed pipe. In this case, a control system may be arranged to shut down the system immediately following a positive detection of such a pressure drop. The control system may be further arranged to communicate this to a remote location to notify that location that immediate service is required.

When the air filtration system is not operating, such as at night, hot water may be supplied into the system to ensure that any grease deposits near the nozzles are dissolved and washed away and also helping to reduce deposits within the fall pipes to the base unit 6.

The water used in the preferred system contains ozone, which ensures the complete eradication of water-borne pathogens. The dissolved ozone ($O_3$) reacts with water ($H_2O$), giving rise to hydroxyl radicals (HO) and oxygen ($O_2$). As the water passes through the nozzles, the ozone and hydroxyls are caused to break out and react with volatile organic compounds, thereby reducing the level of odours released into the atmosphere. Since ozone has a relatively short half-life, it is created continuously by the control system.

This system can be operated with "grey water" such as rain water or water from existing cooling systems.

Alternatively, or in addition to the above features, the water may advantageously be passed through a copper/silver ioniser thereby to create a constant flow of charged ions in the water. This provides the following benefits:

(a) the resulting ionised water acts as an excellent solvent which aids the cleaning of the filter and to reduce the frequency with which the filtration system must be maintained;

(b) in conjunction with the atomisation design of the nozzles, the ionisation of the water results in a significant increase in smoke attraction;

(c) there is an additional attraction of gaseous phase volatile organic compounds: increased absorption of carboxylic acids and aldehydes can be monitored using the techniques of gas chromatography and mass spectrometry well known from forensic science; and (d) ionisation causes the water to be sterilised and thereby rid of certain water-borne micro-organisms, such as pathogens which are responsible for disease in humans.

In an alternative arrangement, an electrostatic precipitator is attached to the downstream end of the system to remove smoke particles prior to atmospheric discharge.

Figure 4:
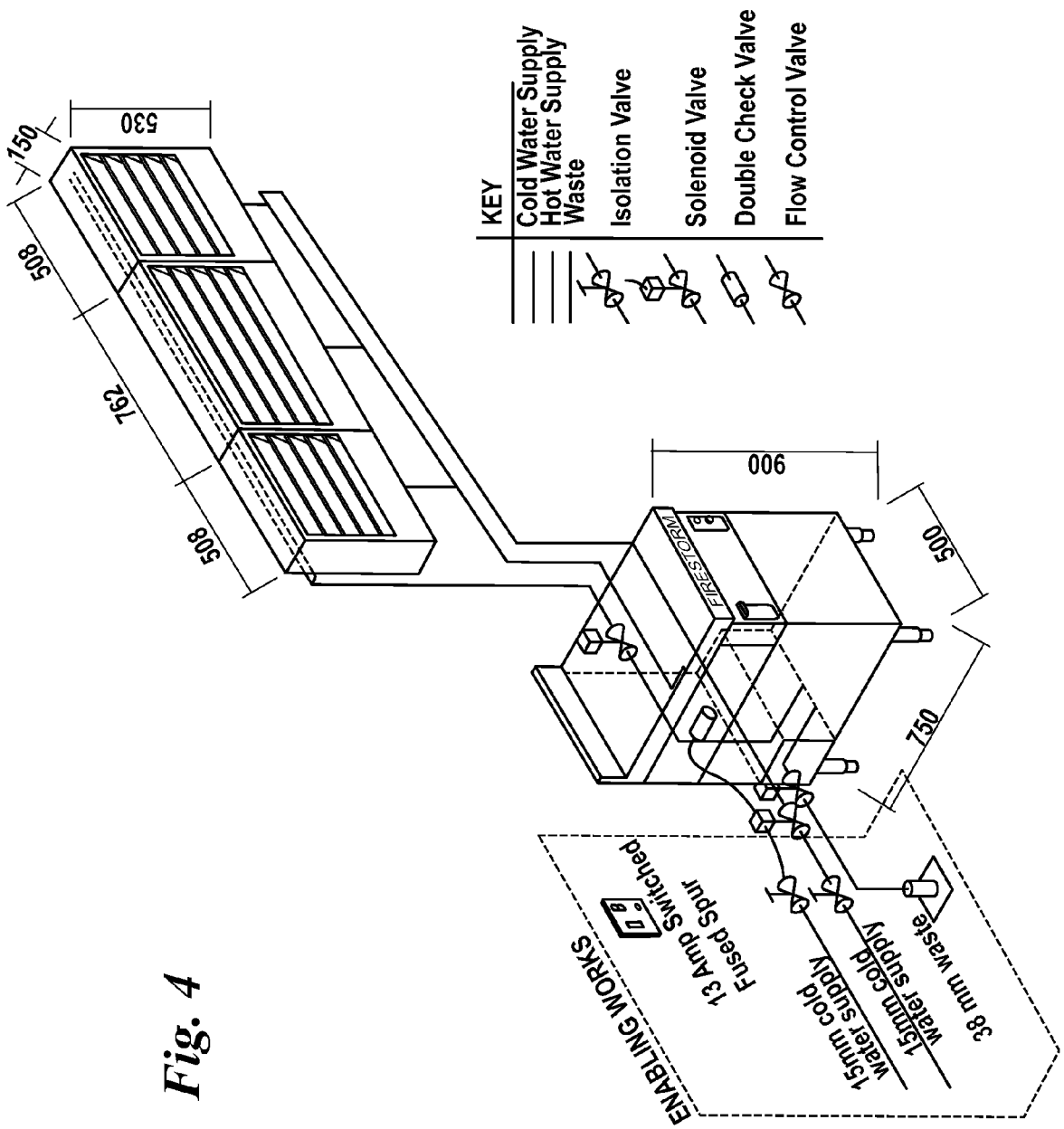
FIG. 4 illustrates the main components of the system of FIG. 2(a) together with their connections to supplies of mains electricity and water.

FIG. 4 illustrates how the system is connected to supplies of mains electricity and water and also to a drain.

Figure 5:
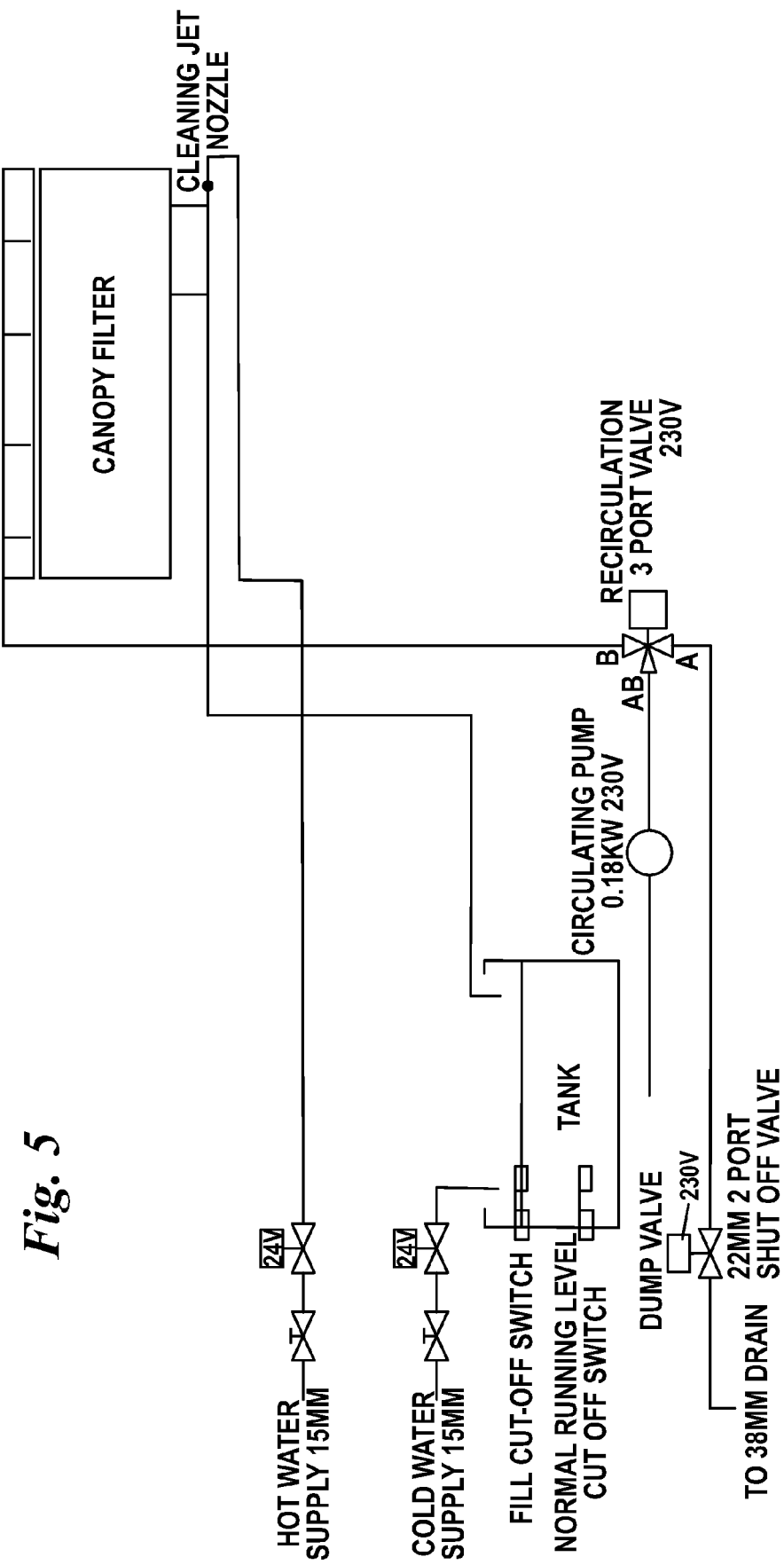
FIG. 5 is a schematic electrical circuit diagram of the system of FIG. 2(a)
Figure 6:
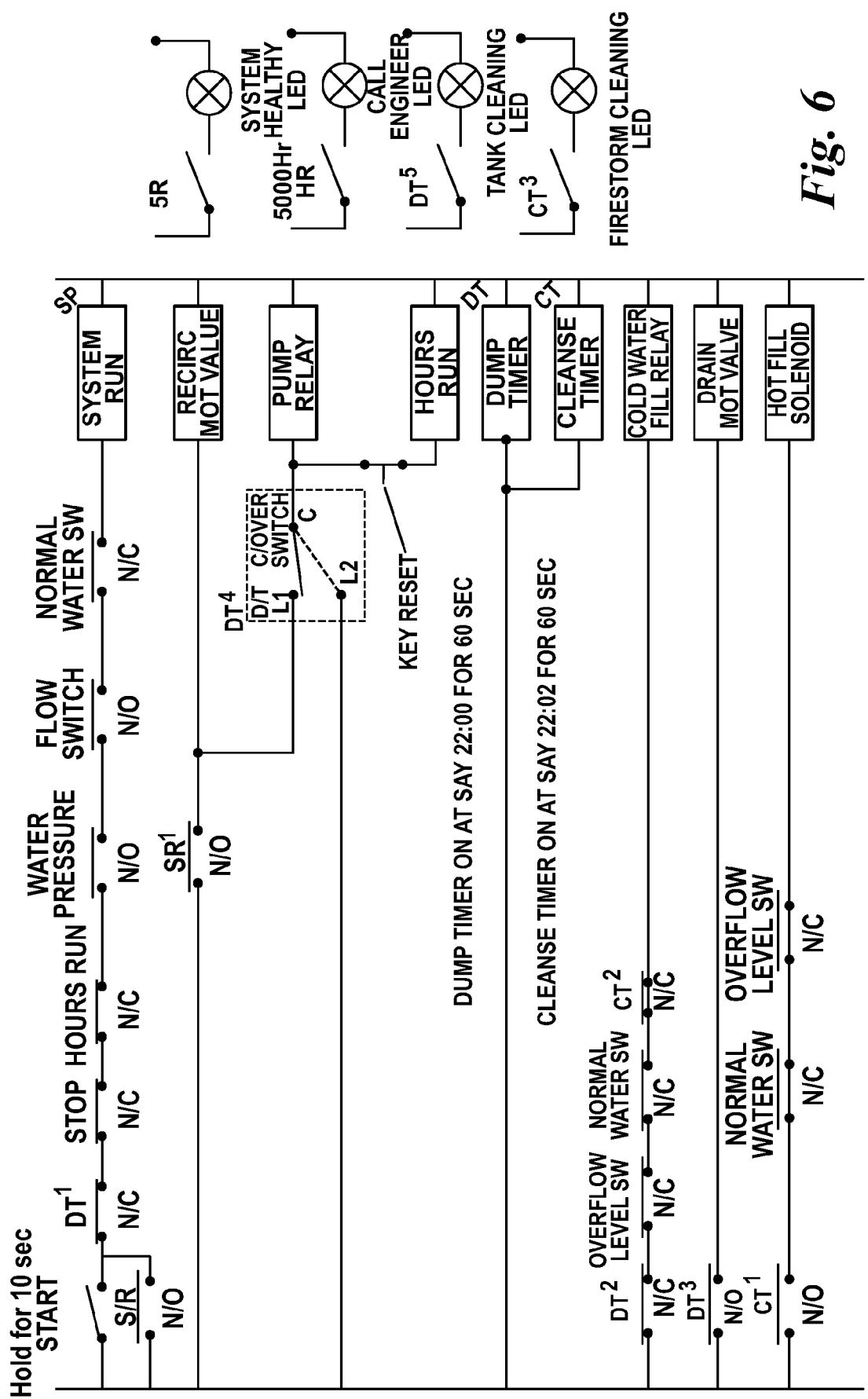
FIG. 6 is a diagram of the control systems used in the system of FIG. 2(a)
Figure 7:
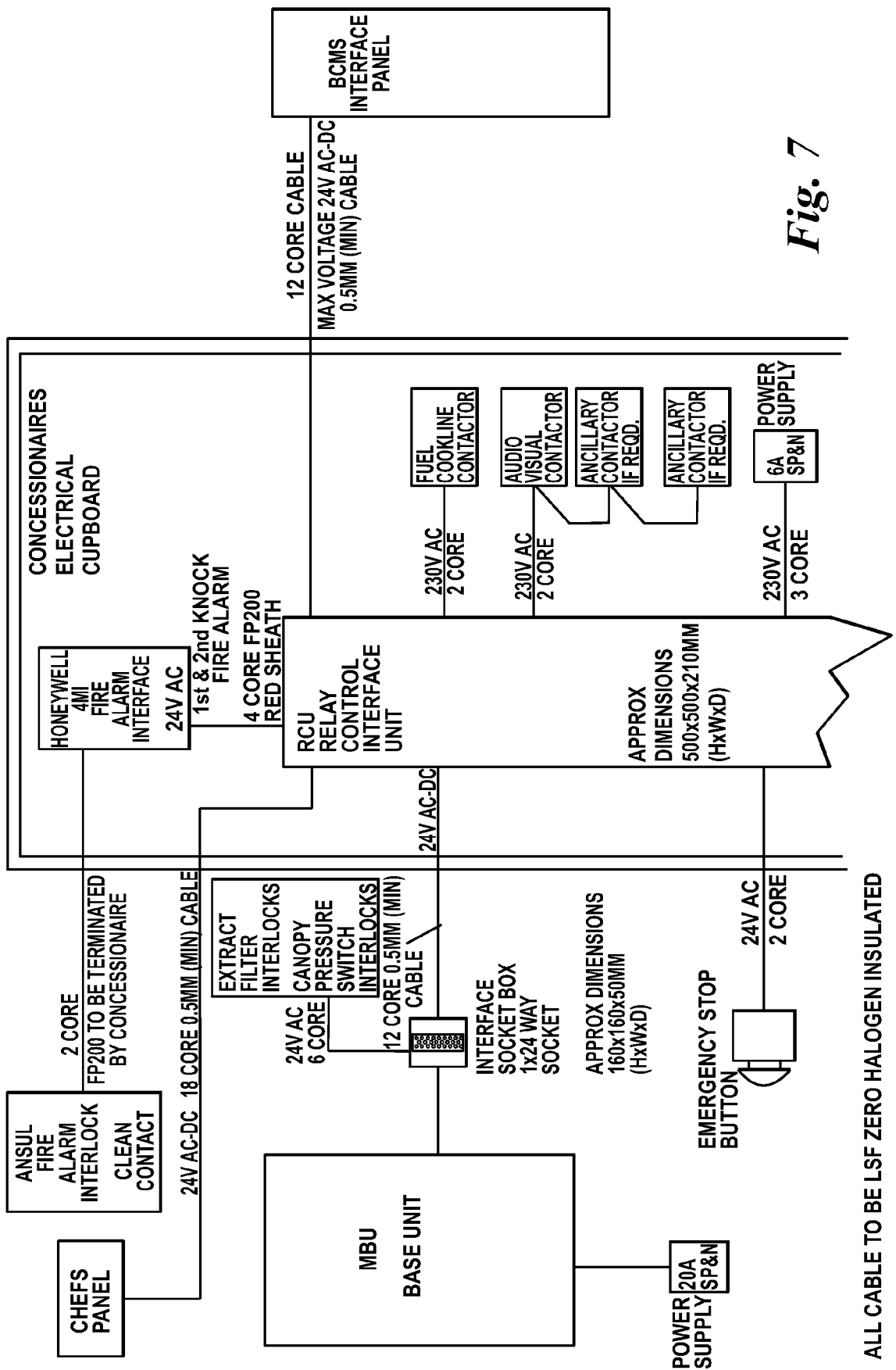
FIG. 7 is a schematic diagram of the control system for use with the air filtration system of FIG. 2(a)

FIG. 5 illustrates the electrical connections within the system of the preferred embodiment, and FIGS. 6 and 7 illustrate the control systems.

The top-level control system ensures that the cook line cannot be operated unless the air filtration system is functioning correctly.

Furthermore, the top-level control system is arranged to shut down the air filtration system automatically after 6,000 hours, and to call out a service engineer after 5,000 hours.

In the event of a shut-down due to failure, the system is arranged to operate for up to 4 hours without significant compromise due to build-up of grease or system deterioration, and a fully interlocked system can include a manger's override key to ensure that service is maintained while an engineer attends to the problem.

The above control features are provided by a sophisticated digital electronic monitoring and control system provided with an EPROM memory for retaining status information in the event of a power failure. The system is also provided with batteries which act as a back-up in the event of mains power failure.

The monitoring and control system are connected to a telemetry system which permits remote diagnostics and maintenance so that break-down recovery procedures can be activated at the earliest possible time.

Furthermore, the monitoring and control system is upgraded by uploading software, which requires no hardwiring. It is also connected to an ISDN telephone line, which enables the control software to be uploaded from a remote location.

Although the air filtration system has been described above as used in the application to air extractors above cooking apparatus, such a system also finds beneficial application in air extraction ducts within plant rooms.

Figure 8:
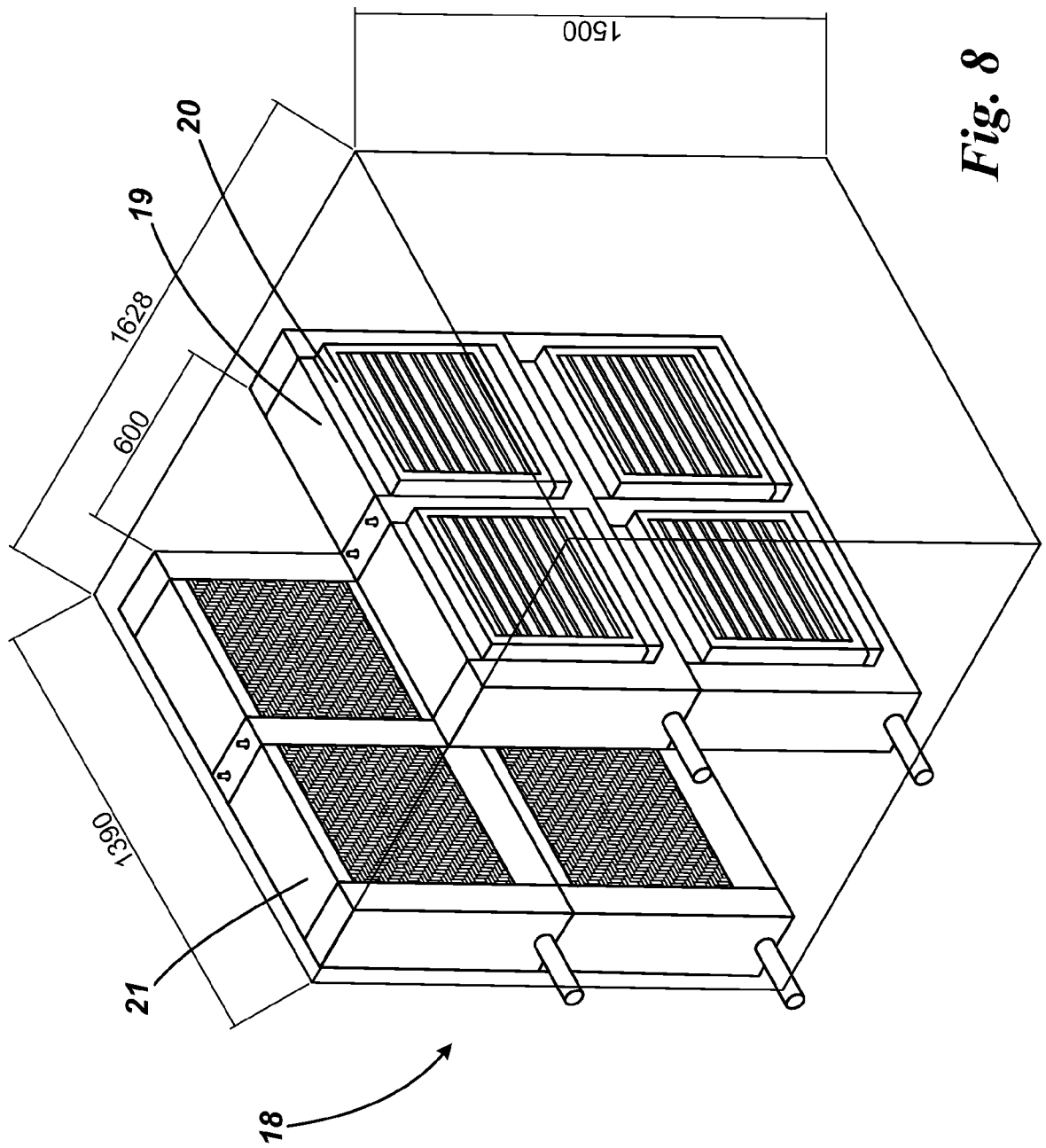
FIG. 8 is an illustration of the application of the present invention to a filtration unit for use in an air extraction duct in a plant room.

FIG. 8 illustrates such an arrangement, from which it can be seen that the unit 18 consists of a first bank 19 of four filters arranged within a vertical plane in a 2×2 array, with a pre-stage baffle 20 mounted at the upstream end of the unit 18. A second bank of filters 21 is mounted in an identical array one meter behind the first bank 19. There is no need for an additional pre-stage baffle to be mounted on the second bank of filters 21, since any large debris will already have been removed by the pre-stage baffle 20.

The filters of this system and the corresponding control system operate in an identical way to the systems described above in relation to the cooker air extractors, except that the design of the base tank is modified to reduce the tank depth to permit the system to be mounted at a low position in the plant room to suit the low ceilings frequently encountered in such environments. Furthermore, the routing of the water supply will be selected for this application so as to provide for ease of access and the maintenance of the desired water pressure.

Three different models for the system are envisaged by the inventors of the present invention:

(a) entry level—a system which is not interlocked and is purely a grease filtration system, as is sufficient for the majority of restaurants, such as are found in high streets;

(b) full specification—a system which is installed and commissioned with fully interlocked systems and supplied with a maintenance programme, such system operating in accordance with the event, cause, effect, action and recovery chart illustrated in Table 1 below; for the full specification system, additional site-specific requirements can be accommodated in upgraded versions;

(c) the enhanced specification—which includes either the entry-level system or the full specification, together with additional modules for the removal of grease and smoke.

TABLE 1

| Cause and Effect for Firestorm | | | | |
| --- | --- | --- | --- | --- |
| Event | Cause | Effect | Action | Recovery |
| Operate key switch | Firestorm fills to operational level | Firestorm can be energised | Appliances can be turned on | Nil |
| Firestorm already has water in tank | Press start button to energise | Canopy becomes functional | Cooking can occur. | Nil |
| Equipment turned on at appliance | Firestorm must be on and functional | Canopy becomes functional | Cooking can occur. | Nil |
| Fire Alarm activates within zone | Firestorm remains on | Fuel supply to ovens is isolated | Cooking disabled | Reset of control panel reqd by staff |
| Loss of water supply to Firestorm | Control panel turns off Firestorm | Fuel supply to ovens is isolated | Cooking disabled | Reinstate water supply |
| Pressure Drop in water supply | Control panel turns off Firestorm | Fuel supply to ovens is isolated | Cooking disabled | Reinstate water pressure |
| Firestorm fails | Air movement switch fails safe | Fuel supply to ovens is isolated | Cooking disabled | Fix Firestorm |
| Circulation pump fails | Burn out of pump motor | Fuel supply to oven is isolated. Control panel indicates fault. | Repair pump, re-set control panel. | Nil |
| Pressure drop in re-circulation system. | Fractured pipe. | Pressure switch detects failure, Firestorm switches off. | Repair fault and reset panel. | Nil |
| Assured water supply fails | Loss of water. | Pressure switch senses loss, shuts down Firestorm. | Re-instate water supply | Nil |
| Firestorm fails to turn on | Flow switch senses blocked nozzle. | Control panel shows fault, Firestorm shuts down. | Clear nozzle blockage | Re-set panel, recovery nil |
| Firestorm fails to turn on | No maintenance undertaken by authorised engineer | 5,000 hour timer shuts down system | Undertake maintenance, reset panel | Nil |

The invention claimed is:

1. A filtration system for removing fats, oils and/or grease contained in an air stream, the system comprising:
   an air flow-defining element adapted to define a path through which air containing fats, oils, and/or grease can flow;
   a water-supplying element adapted to supply water such that the water traverses the air flow path, and, on traversing the air in the air flow path, the water cools the air and thereby causes any vaporized impurities entrained therein, including fats, oils and/or grease, to condense and to fall under gravity out of the air flow path;
   a re-circulating element adapted to re-circulate the water after the water has contacted the air flow path; and a filter for trapping fats, oils and grease entrained in the water after the water has contacted the air flow path, and before the water is recirculated by the re-circulating element,
   wherein the water-supplying element comprises at least one nozzle of substantially circular cross-section and at least one plate, disposed in relation to its associated nozzle such that water emerging from each nozzle is deflected by its associated plate to create a continuous curtain of water,
   the water supplying element supplies a substantially continuous curtain of water which, when viewed along the air flow direction, extends substantially completely across the air flow path, the arrangement being such that the air extracted by the water is caused to traverse the water curtain,
   the water supplying element is arranged to generate at least two curtains of water, each of which extends only partway across the air flow path but which overlap when viewed along the air flow direction to form a composite curtain which extends substantially completely across the air flow path, and
   the at least two curtains of water are located at different positions along the air flow path,
   so that interaction between the curtains is avoided, or at least reduced, so as to inhibit turbulent flow of water within the curtain.

2. A system as claimed in claim 1, wherein the water supplying element comprises at least one nozzle of substantially circular cross-section and at least one plate, disposed in relation to its associated nozzle such that water emerging from each nozzle is deflected by its associated plate to create a continuous curtain of water.

3. An air filtration system comprising an air flow defining element adapted to define a path through which air can flow; a water-supplying element for generating a substantially continuous curtain of water through which the air is caused to pass in use, the water-supplying element comprising a nozzle of substantially circular cross-section and a plate, disposed in relation to the nozzle such that water emerging from the nozzle is deflected by the plate to create the continuous curtain of water,
   the water supplying element is arranged to generate at least two curtains of water, each of which extends only partway across the air flow path but which overlap when viewed along the air flow direction to form a composite curtain which extends substantially completely across the air flow path,
   wherein the substantially continuous composite curtain of water, when viewed along the air flow direction, extends substantially completely across the air flow path, the arrangement being such that the air extracted by the water is caused to traverse the water curtain,
   and
   the at least two curtains of water are located at different positions along the air flow path, so that interaction between the curtains is avoided, or at least reduced, so as to inhibit turbulent flow of water within the curtain.

4. A system as claimed in claim 3, further comprising first and second filter screens located within the air flow path respectively upstream and downstream of the position of the water curtain.

5. A system as claimed in claim 4, further comprising a baffle arrangement located upstream of the first filter screen for removing relatively heavy particulates from the air.

6. A system as claimed in claim 4, further comprising a mesh filter located downstream of the second filter screen for removing residual particulates from the air.

7. An air filtration system comprising an array of filters, each of which comprises a system as claimed in claim 1.

8. An air filtration system comprising an upstream and a downstream array of filters, each filter comprising a system as claimed in claim 1.

9. An air filtration system as claimed in claim 8, wherein each of the upstream array of filters comprises a baffle arrangement located upstream of the filter for removing relatively heavy particulates from the air.

10. A system as claimed in claim 1, wherein the water comprises dissolved ozone at a concentration of at least 1 ppm by mass.

11. An air filtration system as claimed in claim 3, wherein the substantially continuous curtain of water is pressurized.

12. An air filtration system as claimed in claim 11, wherein the water is pressurized to between 3 and 4 bar gauge.

13. An air filtration system as claimed in claim 3, further comprising a water ionizing element.

14. A system as claimed in claim 1, further comprising an electrostatic precipitator for removing smoke prior to atmospheric discharge.

15. A system as claimed in claim 1, further comprising a telemetry system for enabling remote diagnostics and maintenance of the system.

* * * * *

UNITED STATES PATENT AND TRADEMARK OFFICE
CERTIFICATE OF CORRECTION

PATENT NO. : 8,440,007 B2  
APPLICATION NO. : 12/409233  
DATED : May 14, 2013  
INVENTOR(S) : Verner et al.

Page 1 of 1

It is certified that error appears in the above-identified patent and that said Letters Patent is hereby corrected as shown below:

Title Page, Item (22): Please correct Item (22) by including the following information:

(22) PCT Filed: Sep. 19, 2007  
(86) PCT No.: PCT/GB07/003547  
§ 371 (c)(1),  
(2), (4) Date: Mar. 23, 2009  
(87) PCT Pub. No.: WO 08/035064  
PCT Pub. Date: Jul. 3, 2008

Signed and Sealed this  
Third Day of September, 2013

Teresa Stanek Rea  
*Acting Director of the United States Patent and Trademark Office*